United States Patent
Chen (10) Patent No.: US 7,421,385 B2
(45) Date of Patent: Sep. 2, 2008

(54) METHOD AND SYSTEM OF PROCESSING DATA THAT CONTAIN ASIAN LANGUAGE CHARACTERS

(75) Inventor: Shi-Shien Chen, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 798 days.

(21) Appl. No.: 10/826,090

(22) Filed: Apr. 16, 2004

(65) Prior Publication Data

US 2005/0234706 A1    Oct. 20, 2005

(51) Int. Cl.
*G06F 17/20* (2006.01)
*H03M 7/00* (2006.01)

(52) U.S. Cl. .................................. 704/8; 341/50
(58) Field of Classification Search .................. None
See application file for complete search history.

(56) References Cited

U.S. PATENT DOCUMENTS

| | | | | |
|---|---|---|---|---|
| 4,574,362 A | * | 3/1986 | Spindel et al. | 710/65 |
| 5,455,577 A | * | 10/1995 | Slivka et al. | 341/51 |
| 6,620,207 B1 | * | 9/2003 | Lin | 715/536 |
| 6,915,352 B2 | * | 7/2005 | Ho et al. | 709/246 |
| 7,013,422 B2 | * | 3/2006 | McCarley et al. | 714/794 |

* cited by examiner

*Primary Examiner*—David R. Hudspeth
*Assistant Examiner*—Samuel G Neway
(74) *Attorney, Agent, or Firm*—Haynes Boone, LLP (57) ABSTRACT

The present disclosure provides a system and method for processing semiconductor manufacturing data. In one example, a method for processing data includes processing one or more bytes of a data set as a block wherein the data set comprises Asian language characters; comparing the first byte of the one or more bytes with a value; and inserting an identifier after each byte of the one or more bytes, if the first byte is larger than the value.

10 Claims, 8 Drawing Sheets

METHOD AND SYSTEM OF PROCESSING DATA THAT CONTAIN ASIAN LANGUAGE CHARACTERS

BACKGROUND

The present disclosure relates generally to the field of semiconductor manufacturing and, more particularly, to a system and method for processing semiconductor manufacturing data.

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing have been needed. For example, an IC is formed by creating one or more devices (e.g., circuit components) on a substrate using a fabrication process. As the geometry of such devices is reduced to the submicron or deep submicron level, the IC's active device density (i.e., the number of devices per IC area) and functional density (i.e., the number of interconnected devices per IC area) has become limited by the fabrication process.

Furthermore, as the IC industry has matured, the various operations needed to produce an IC may be performed at different locations by a single company or by different companies that specialize in a particular area. This further increases the complexity of producing ICs, as companies and their customers may be separated not only geographically, but also by time zones, making effective communication more difficult. For example, a first company (e.g., an IC design house) may design a new IC, a second company (e.g., an IC foundry) may provide the processing facilities used to fabricate the design, and a third company may assemble and test the fabricated IC. A fourth company may handle the overall manufacturing of the IC, including coordination of the design, processing, assembly, and testing operations.

DETAILED DESCRIPTION

For the purposes of promoting an understanding of the principles of the invention, references will now be made to the embodiments, or examples, illustrated in the drawings and specific languages will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure relates generally to the field of semiconductor manufacturing and, more particularly, to a system and method for processing semiconductor manufacturing data that contain Asian language characters. Due to the increased complexity of semiconductor manufacturing, many systems may be required to perform the manufacturing operations, and it may be necessary for them to process data that contain both English words and Asian language characters, as many semiconductor manufacturers are now located in Asia. However, as different systems may store Asian language characters differently, errors may occur as the systems attempt to directly communicate with each other. Therefore, it is desired to provide an adapter system that facilitates the communication between and among various systems.

Figure 1:
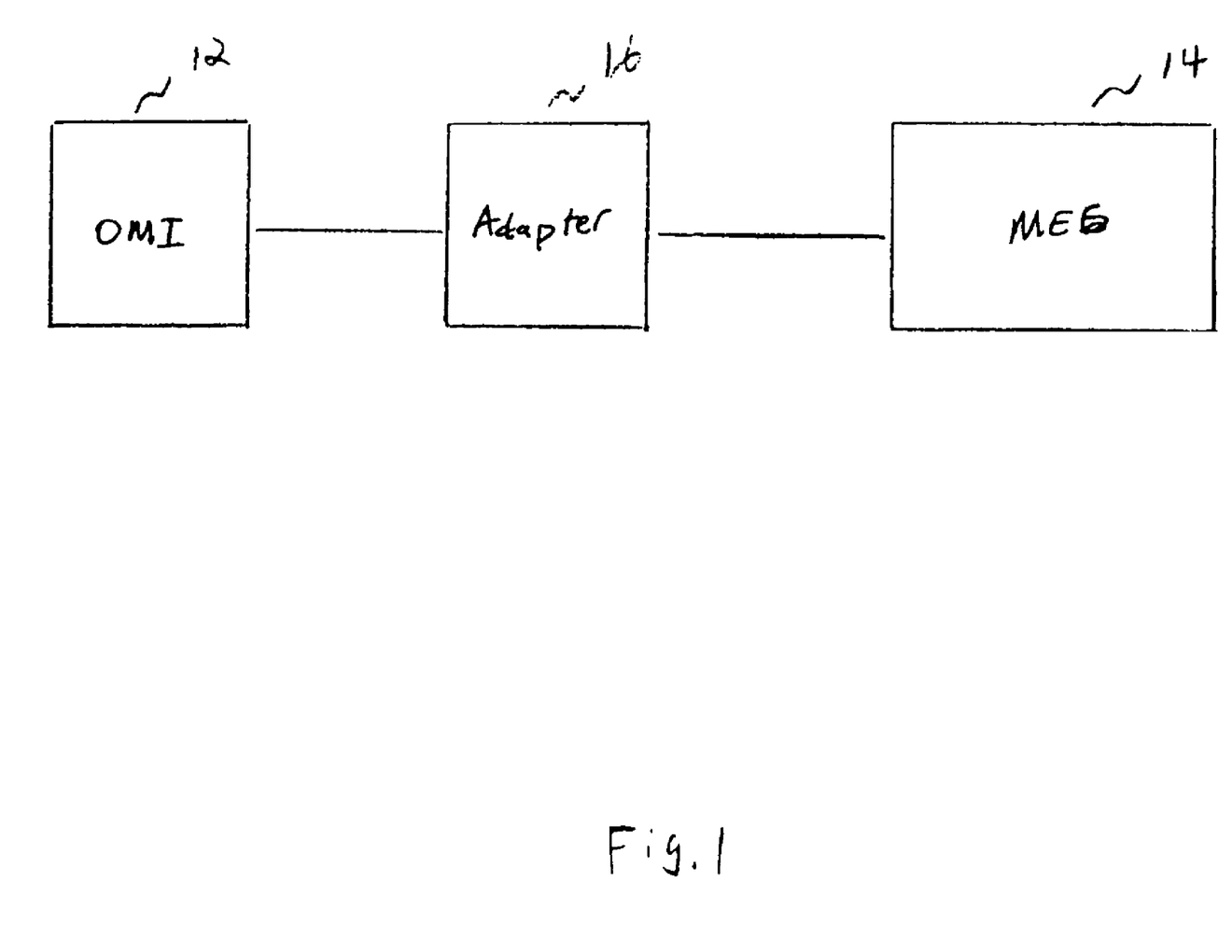
FIG. 1 illustrates selected components of a semiconductor manufacturing system according to one embodiment of the present disclosure.

The current disclosure may be utilized in the following example: a manufacturing facility is based in Taiwan, and utilizes a semiconductor manufacturing executing system (MES), which may be connected to manufacturing machines on the floor. The MES may provide information with respect to a particular machine, such as the status of the machine, and the tasks to be performed by the machine. It may also provide production information, such as what sequence may be applied to certain wafers. Referring now to FIG. 1, shown therein are selected components of a semiconductor manufacturing system according to one embodiment of the present disclosure. In this example, an operator management interface (OMI) 12 may be used for an operator of a manufacturing machine to communicate with a manufacturing executing system 14. As the OMI 12 may be developed by a standard programming language, such as Microsoft's Visual Basic language, it may store each Chinese character or English word in two bytes of data. On the other hand, the MES 14 may store each English word in one byte of data, and each Chinese character in two bytes of data. As a result, the OMI 12 and MES 14 are unable to directly communicate with each other without incurring errors. Accordingly, the present disclosure provides an adapter 16, which may be used to facilitate the communication between the OMI 12 and the MES 14.

Figure 2A:
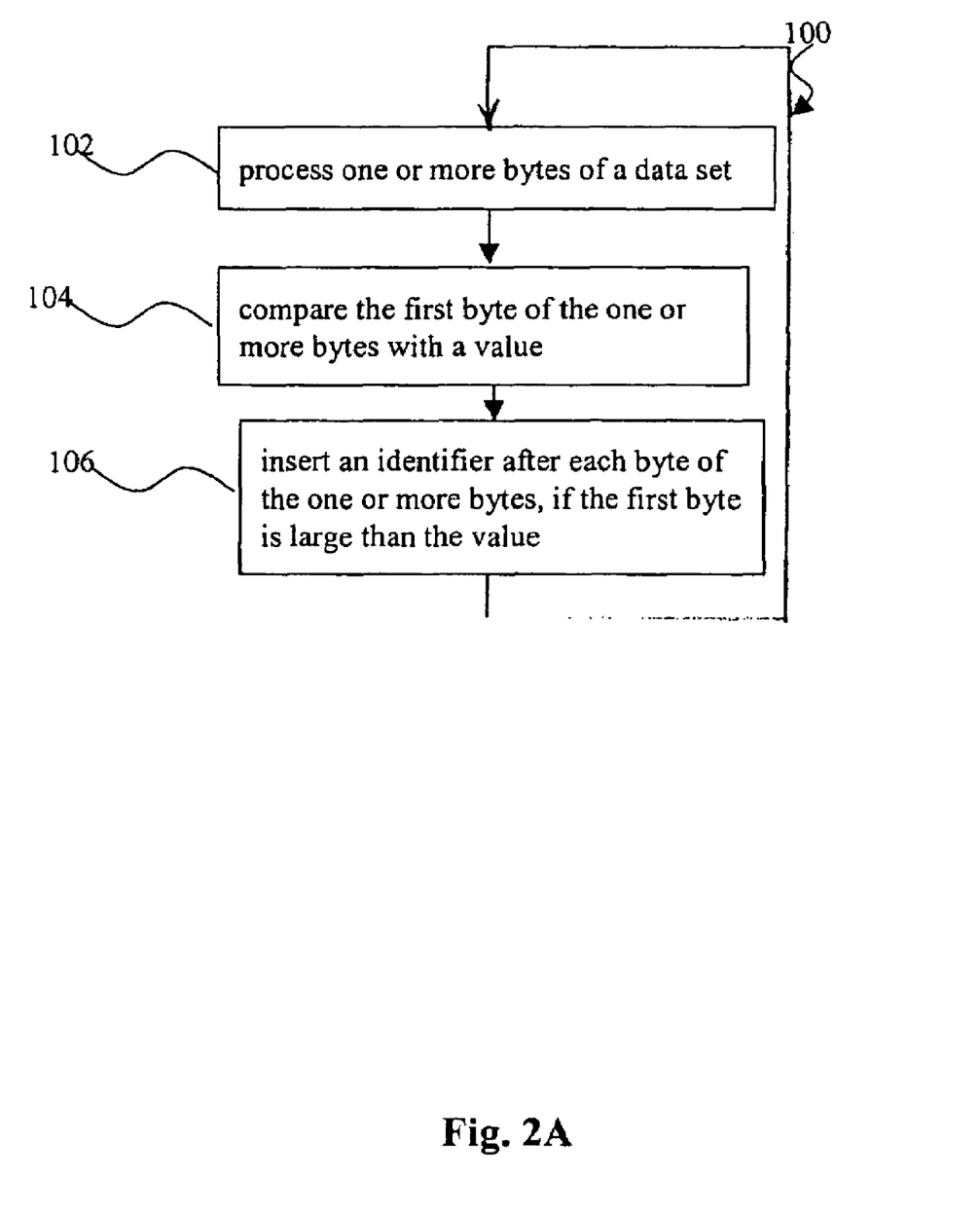
FIG. 2A illustrates one method for process semiconductor manufacturing data according to one embodiment of the present disclosure.

Referring now to FIG. 2A, shown therein is a method 100 provided by the adapter 16 for facilitating the communication between the MES and the OMI according to one embodiment of the present disclosure. In this embodiment, the method 100 may process a data set entered into the OMI 12 by an operator, so that the data may be used for the MES 14. Step 102 of the method 100 processes one or more bytes of the data set as a block, step 104 of the method 100 compares the first byte of the one or more bytes with a value, and step 106 of the method 100 inserts an identifier after each byte of the one or more bytes, if the first byte is larger than the value. The method 100 will be further described below in connections with FIGS. 3 and 4.

Figure 2B:
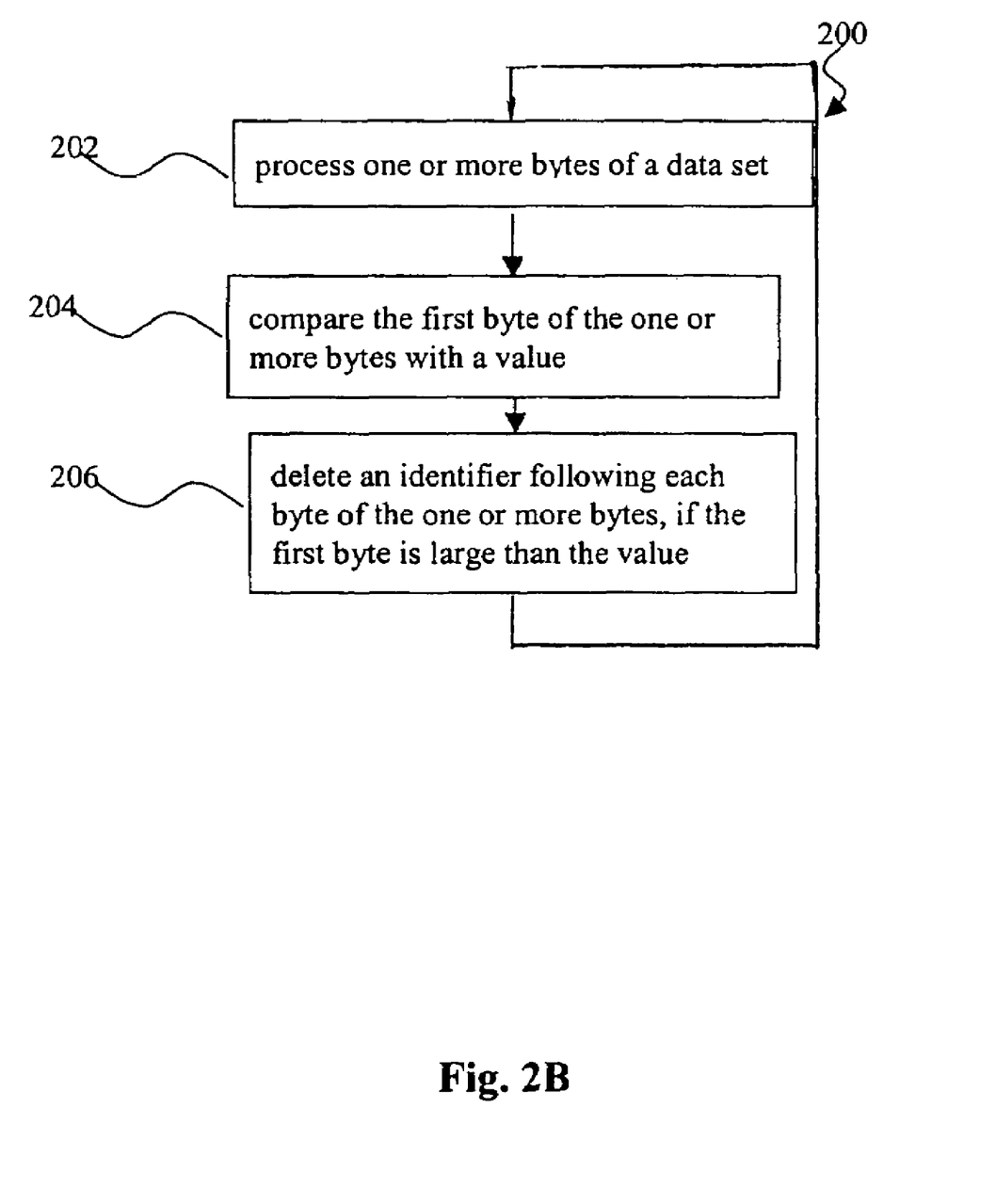
FIG. 2B illustrates another method for process semiconductor manufacturing data according to one embodiment of the present disclosure.

Referring now to FIG. 2B, shown therein is a method 200 provided by the adapter 16 for processing data communicated from the MES 14 to the OMI 12 according to one embodiment of the present disclosure. In this embodiment, the method 200 may process data from the MES 14 to the OMI 12, so that an operator may review the processed data from the OMI 12. Step 202 of the method 200 processes one or more bytes of the data set as a block, step 204 of the method 200 compares the first byte of the one or more bytes with a value, and step 206 of the method 200 deletes an identifier following each byte of the one or more bytes, if the first byte is larger than the value. The method 200 will be further described below in connections with FIGS. 3 and 5.

Figure 3:
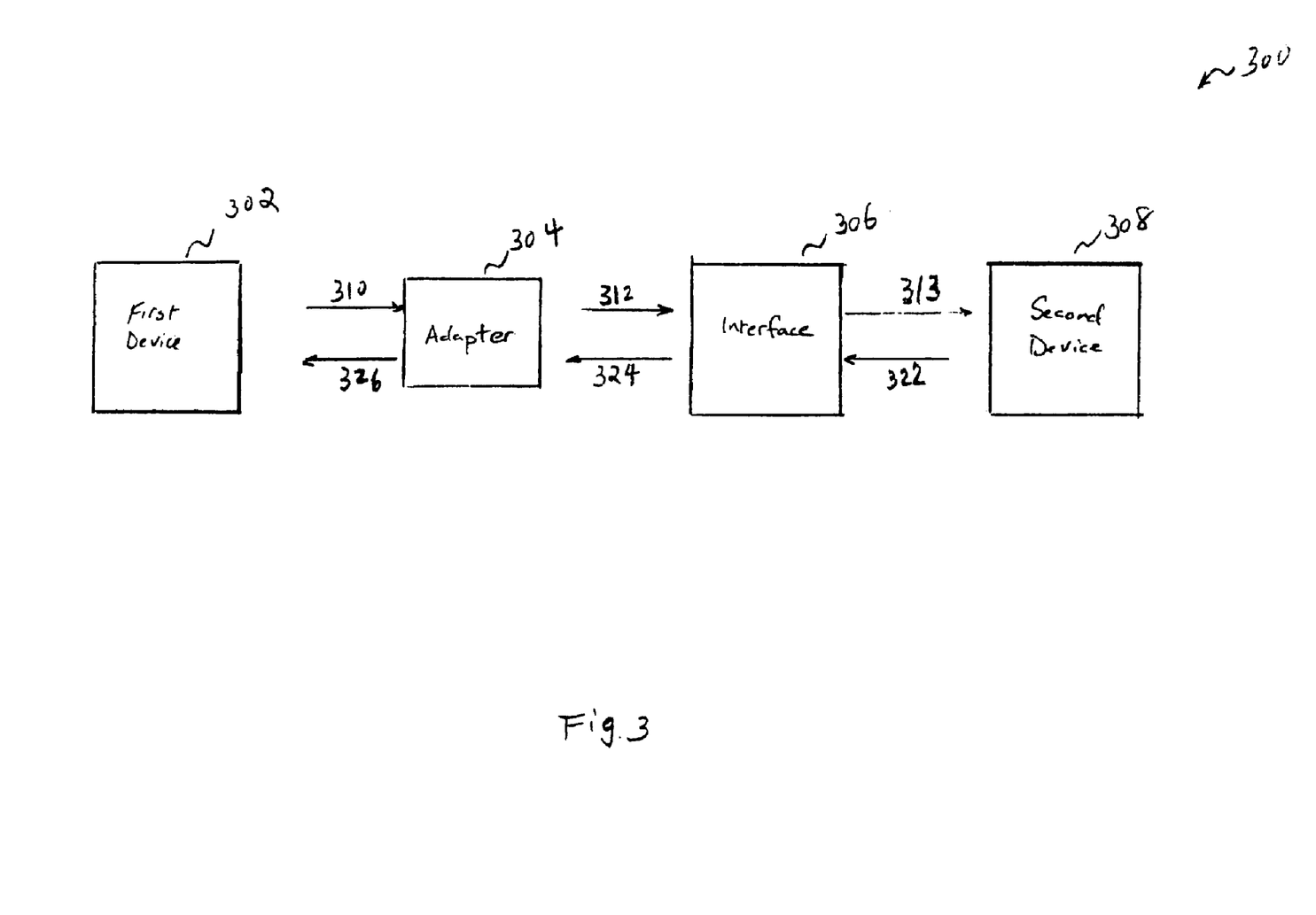
FIG. 3 illustrates a system for implementing the methods of FIGS. 2A-2B according to one embodiment of the present disclosure.

Referring now to FIG. 3, shown therein is an implementation of the methods 100 and 200 by a system 300 according to one embodiment of the present disclosure. In this embodiment, the system 300 may be used for a semiconductor manufacturing facility, and may include a first device 302, an adapter 304, an interface system 306, and a second device 308. Here, the first device 302 may be a device for interacting with an operator of a semiconductor manufacturing machine. For example, it may be an OMI, a personal computer, a personal digital assistant, a pager, a cellular telephone, and other devices. In this example, the OMI may be developed by a standard programming language, such as Microsoft's Visual Basic language.

The adapter 304, which may be a software program written in a standard programming language, will be further described below.

In furtherance of the example, the interface 306 may be a device connecting the first device 302 and the second device 308, which may be a software program or a hardware device. In one example, the interface 306 may comprise COMet, a product by Iona Technologies, which supports application integration across network boundaries, different operating systems, and a variety of programming languages. It is contemplated that the interface 306 may be optional, and that it may be included in any of the second device 308, the adapter 304, or the first device 302.

In furtherance of the example, the second device 308 may be a MES, which may be an integrated computer system representing the methods and tools used to accomplish semiconductor production. In the present example, the primary functions of the MES 308 may include collecting data in real time, organizing and storing the data in a centralized database, work order management, workstation management, process management, inventory tracking, and document control. It may provide information such as a process sequence for each product, and information for use by machines connected to the MES 308. Examples of the MES 308 may include Siview (International Business Machine Corporation), Promis (Brooks Automation Inc. of Massachusetts), Workstream (Applied Materials, Inc. of California), Poseidon (IBM Corporation of New York), and Mirl-MES (Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES 308 may be based on a AIX (An open UNIX operating environment from IBM) operating system and compatible with the first device 302, or may be based on other platforms and utilize the interface 306 to establish communications with the first device 302.

Figure 4:
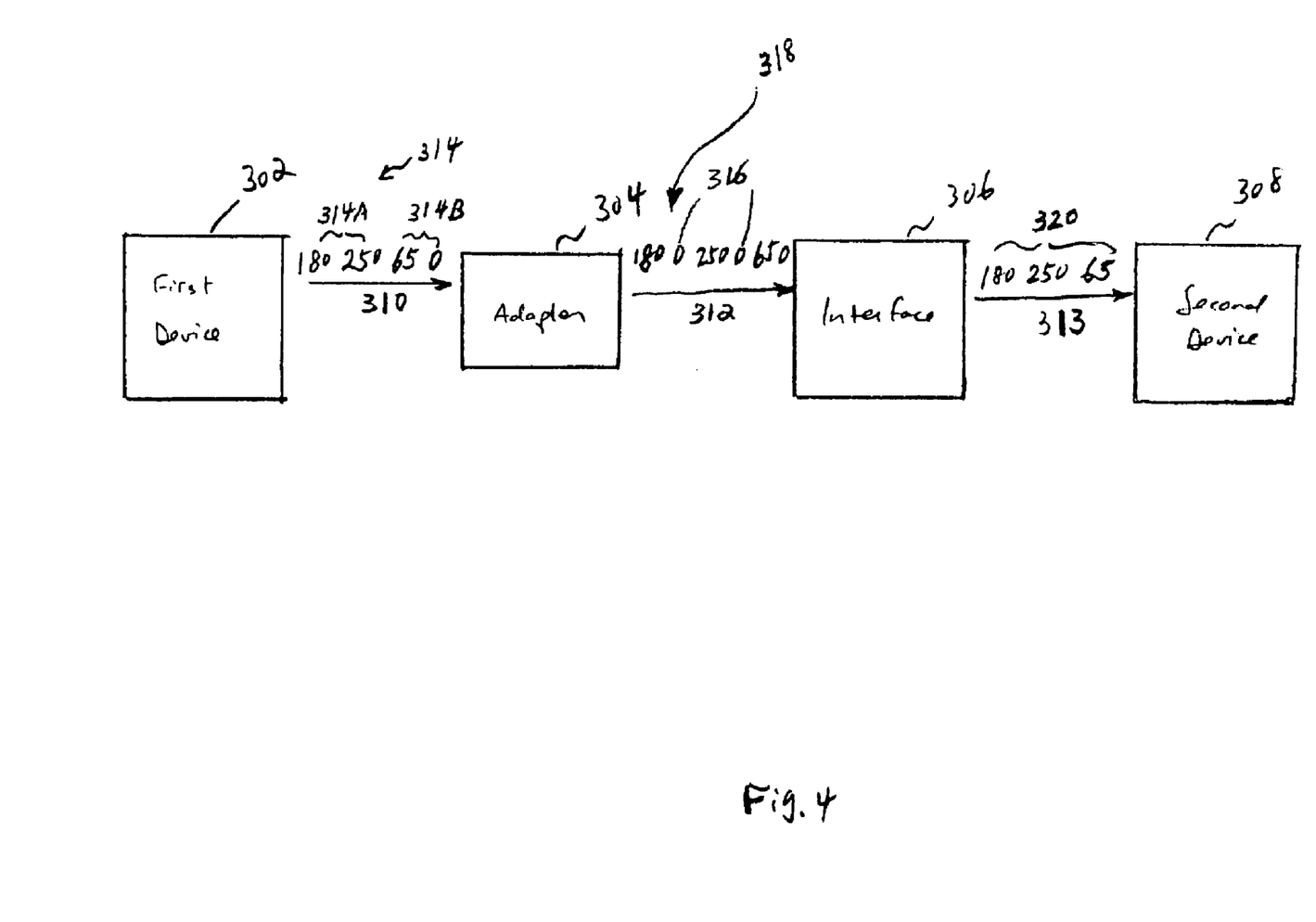
FIGS. 4-5 illustrates details for implementing the methods of FIGS. 2A-2B according to one embodiment of the present disclosure.

Another embodiment of the method 100 (FIG. 2A) will now be further described. Referring also to FIG. 4, in an exemplary operation of the method 100, an operator may input data, which may include Chinese characters, to the first device 302. The first device 302 may store each word, including each Chinese character or English word, in two bytes. As each Chinese character is recognized by the first device 302 as a symbol character, it is known in the art that its first byte may comprise a value that is larger than the number 127. Referring specifically to FIG. 4, in one example, as indicated by the arrow 310, the data set 314 may be communicated from the first device 302 to the adapter 304. In this example, the data set 314 may comprise four bytes 180, 250, 65, and 0 (the first two bytes 314A represent a Chinese character, while the second two bytes 314B represent an English word). According to the step 102 of the method 100, the adapter 304 may process every two bytes of the data set 314, which may comprise the first two bytes 314A and the second two bytes 314B. Initially, the first two bytes 314A may be processed: continuing with the step 104 of the method 100, the adapter 304 may compare the first byte 180 of the first two bytes 314A with the value 127. Then, according to the step 106, since the first byte 180 is larger than the value 127, an identifier 316, which may be 0, may be inserted after each byte of the first two bytes 314A. Then, the two bytes 314B may be processed: continuing with the step 104 of the method 100, the adapter 304 may compare the first byte 65 of the second two bytes 314B with the value 127. Thereafter, according to the step 106, since the first byte 65 is not larger than the value 127, no identifier will be inserted. At this point, with the addition of the identifier 316, the data set 314 has been transformed into a new data set 318, which comprises 180, 0, 250, 0, 65, 0.

In furtherance of the example, as indicated by the arrow 312, the new data set 318 may be transmitted from the adapter 304 to the interface 306, which may comprise COMet. It is known in the art that COMet may process the data set 318, and transform it into a data set 320, which may be further received by the second device 308. Product information on COMet (attached hereto as Exhibit A) is hereby incorporated by reference in its entirety.

It is contemplated that many variations of the above example may be applied to the present disclosure. In one example, instead of processing every two bytes of the data set 314 as a block, the adapter 304 may process one byte or at least three bytes of the data set 314 as a block. In another example, the identifier 316 may be a value that is not 0, or that different identifiers may be inserted after each byte of the first two bytes 314A. In a third example, an identifier 316 may be inserted after each byte of the second two bytes 314B, while a different identifier or no identifier will be inserted after each byte of the first two bytes 314A. In a fourth example, besides Chinese characters, the data set 314 may include symbols or other Asian characters, such as Korean or Japanese characters, and they may be similarly processed.

Figure 5:
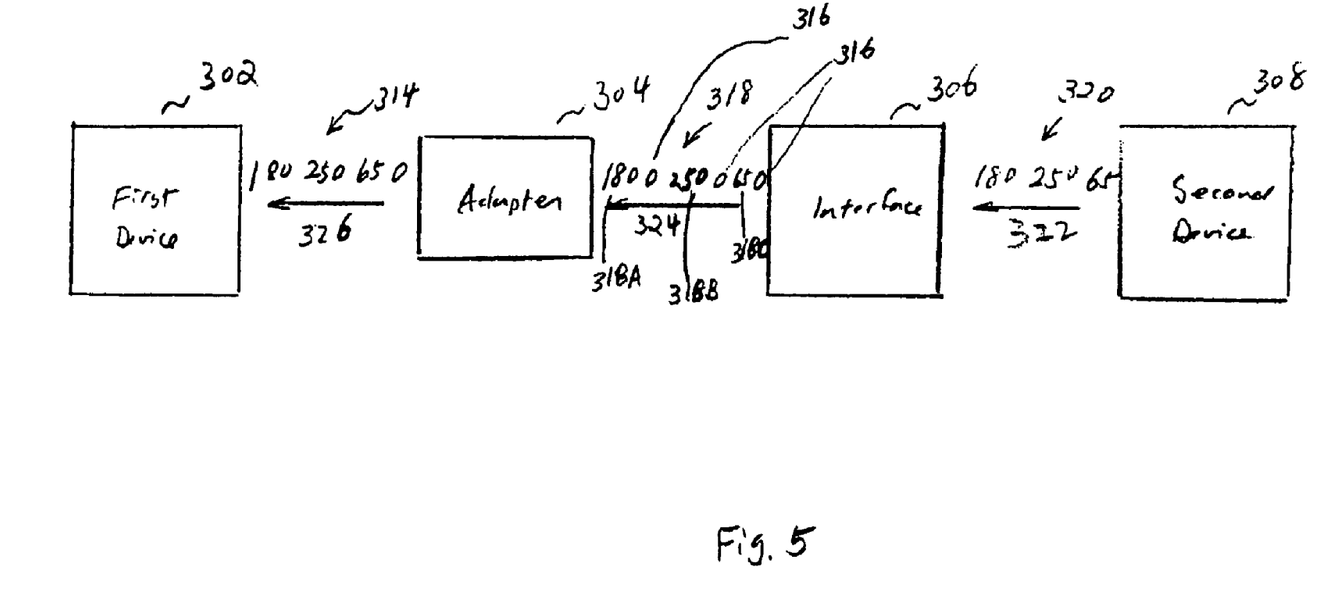

Another embodiment of the method 200 (FIG. 2B) will now be further described. Referring also to FIG. 5, in an exemplary operation of the method 200, an operator may retrieve data, which may include Chinese characters, from the second device 308 to the first device 302. The second device 308 may store each Chinese character in two bytes while storing each English word in one byte. Referring specifically to FIG. 5, in one example, as indicated by the arrow 322, the data set 320, which may be 180, 250, 65 (a Chinese character is represented by 180, 250, while an English word is represented by 65), may be communicated to the interface 306. It will be understood that it is known in the art that the interface 306, which may comprise COMet, may transform the data set 320 into the data set 318, and then forward it to the adapter 304, which may be a software program written in a standard programming language. According to the step 202 of the method 200, the adapter 304 may process each byte of the data set 318 as a block. First, the byte 318A may be processed: continuing with the step 204 of the method 200, the adapter 304 may compare the first byte 318A with the value 127. Then, according to the step 206, since the first byte 318A, which may be 180, is larger than the value 127, the adapter 304 may delete the identifier 316, which is 0 and follows the first byte 318A. Second, the second byte 318B may be processed: continuing with the step 204 of the method 200, because each Chinese character may comprise two bytes, the second byte 318B may be recognized as the second byte of a Chinese character. Then, according to the step 206, since the first byte 318A, which may be 180, is larger than the value 127, the adapter 304 may delete the identifier 316, which is 0 and follows the second byte 318B. Third, the third byte 318C may be processed: continuing with the step 204 of the method 200, the adapter 304 may compare the third byte 318C with the value 127. Then, according to the step 206, since the third byte 318C, which may be 65, is not larger than the value 127, the adapter 304 does not delete any identifier following the third byte 318C.

In furtherance of the example, as indicated by the arrow 326, the new data set 314 may then be transmitted from the adapter 304 to the first device 302.

It is contemplated that many variations of the above example may be applied to the present disclosure. In one example, instead of separately processing each byte of the data set 318, the adapter 304 may process two or more bytes of the data set 318 as a block. In another example, the identifier 316 may be a value that is not 0. In a third example, the data set 318 may include symbols or other Asian characters, such as Korean or Japanese characters, and they may be similarly processed.

Figure 6:
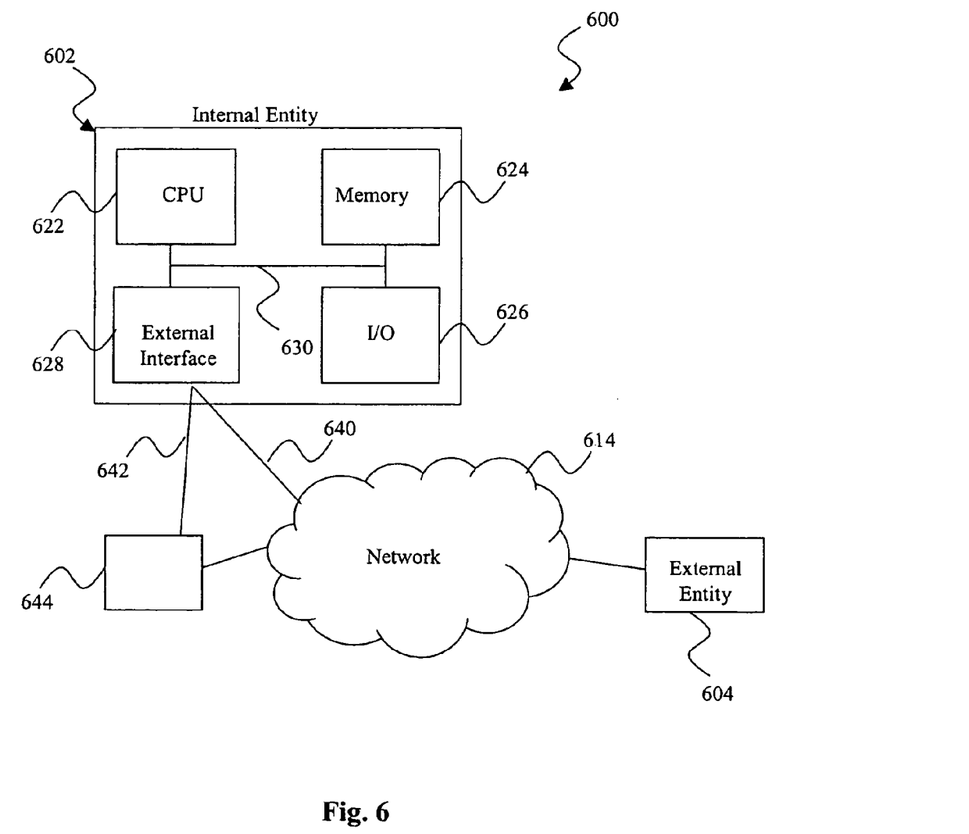
FIG. 6 illustrates a virtual IC fabrication system for implementing the methods of FIGS. 2A-2B according to one embodiment of the present disclosure.

An exemplary system for implementing the methods 100 and 200 will now be described. Referring now to FIG. 6, shown therein is a virtual IC fabrication system (the "virtual fab") 600 that can be used to implement the methods 100 and 200 according to one embodiment of the present disclosure. The virtual fab 600 includes a plurality of entities, represented by one or more internal entities 602 and one or more external entities 604 that are connected by a communications network 614. The network 614 may be a single network or may be a variety of different networks, such as an intranet and the Internet, and may include both wireline and wireless communication channels.

Each of the entities 602, 604 may include one or more computing devices such as personal computers, personal digital assistants, pagers, cellular telephones, and the like. For the sake of example, the internal entity 602 is expanded to show a central processing unit (CPU) 622, a memory unit 624, an input/output (I/O) device 626, and an external interface 628. The external interface may be, for example, a modem, a wireless transceiver, and/or one or more network interface cards (NICs). The components 622-628 are interconnected by a bus system 630. It is understood that the internal entity 602 may be differently configured and that each of the listed components may actually represent several different components. For example, the CPU 622 may represent a multi-processor or a distributed processing system; the memory unit 624 may include different levels of cache memory, main memory, hard disks, and remote storage locations; and the I/O device 626 may include monitors, keyboards, and the like.

The internal entity 602 may be connected to the communications network 614 through a wireless or wired link 640, and/or through an intermediate network 644, which may be further connected to the communications network 614. The intermediate network 644 may be, for example, a complete network or a subnet of a local area network, a company wide intranet, and/or the Internet. The internal entity 602 may be identified on one or both of the networks 644, 614 by an address or a combination of addresses, such as a media control access (MAC) address associated with the network interface 628 and an internet protocol (IP) address. Because the internal entity 602 may be connected to the intermediate network 644, certain components may, at times, be shared with other internal entities. Therefore, a wide range of flexibility is anticipated in the configuration of the internal entity 602. Furthermore, it is understood that, in some implementations, a server may be provided to support multiple internal entities 602. In other implementations, a combination of one or more servers and computers may together represent a single entity.

In the present example, the internal entities 602 represents those entities that are directly responsible for producing the end product, such as a wafer or individually tested IC devices. Examples of internal entities 602 include a machine operator, an engineer, customer service personnel, an automated system process, a design or fabrication facility and fab-related facilities such as raw-materials, shipping, assembly or test. Examples of external entities 604 include a customer, a design provider; and other facilities that are not directly associated or under the control of the fab. In addition, additional fabs and/or virtual fabs can be included with the internal or external entities. Each entity may interact with other entities and may provide services to and/or receive services from the other entities.

It is understood that the entities 602-604 may be concentrated at a single location or may be distributed, and that some entities may be incorporated into other entities. In addition, each entity 602, 604 may be associated with system identification information that allows access to information within the system to be controlled based upon authority levels associated with each entities identification information.

The virtual fab 600 enables interaction among the entities 602-604 for purposes related to IC manufacturing, as well as the provision of services. In the present example, IC manufacturing can include one or more of the following steps:

a. receiving or modifying a customer's IC order of price, delivery, and/or quantity;
b. receiving or modifying an IC design;
c. receiving or modifying a process flow;
d. receiving or modifying a circuit design;
e. receiving or modifying a mask change;
f. receiving or modifying testing parameters;
g. receiving or modifying assembly parameters; and
h. receiving or modifying shipping of the ICs.

One or more of the services provided by the virtual fab 600 may enable collaboration and information access in such areas as design, engineering, and logistics. For example, in the design area, the customer 604 may be given access to information and tools related to the design of their product via the fab 602. The tools may enable the customer 604 to perform yield enhancement analyses, view layout information, and obtain similar information. In the engineering area, the engineer 602 may collaborate with other engineers 602 using fabrication information regarding pilot yield runs, risk analysis, quality, and reliability. The logistics area may provide the customer 604 with production status, testing results, order handling, and shipping dates. It is understood that these areas are exemplary, and that more or less information may be made available via the virtual fab 600 as desired.

Another service provided by the virtual fab 600 may integrate systems between facilities, such as between a facility 604 and the fab facility 602. Such integration enables facilities to coordinate their activities. For example, integrating the design facility 604 and the fab facility 602 may enable design information to be incorporated more efficiently into the fabrication process, and may enable data from the fabrication process to be returned to the design facility 604 for evaluation and incorporation into later versions of an IC.

Figure 7:
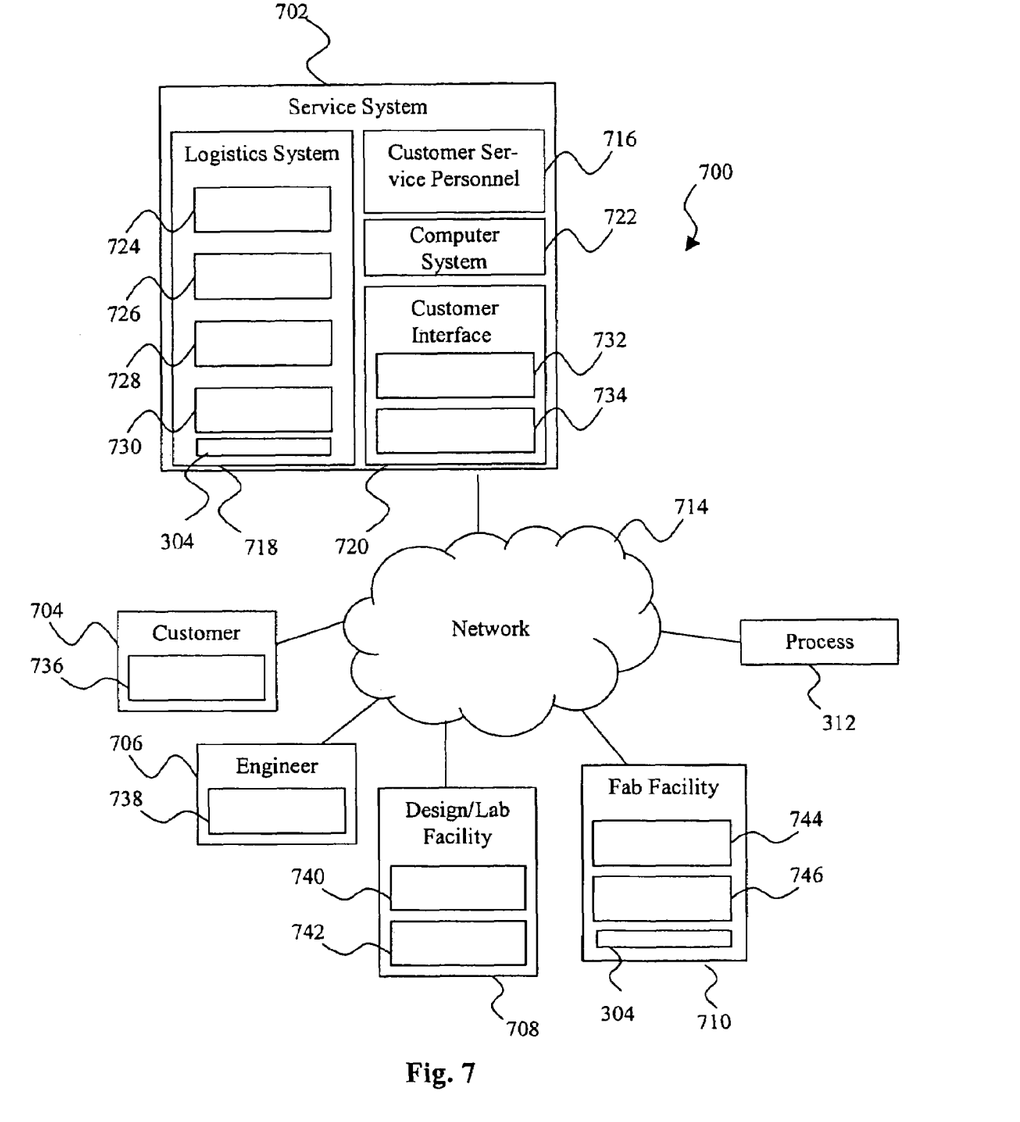
FIG. 7 illustrates a detailed virtual IC fabrication system of FIG. 6 according to one embodiment of the present disclosure.

Referring now to FIG. 7, shown therein is a virtual fab 700 illustrating a more detailed example of the virtual fab 600 of FIG. 6. It is understood, however, that the details described in FIG. 7 are provided for the sake of example, and that other examples can also be used.

The virtual fab 700 includes a plurality of entities 702, 704, 706, 708, 710, and 712 that are connected by a communications network 714. In the present example, the entity 702 represents a service system, the entity 704 represents a customer, the entity 706 represents an engineer, the entity 708 represents a design/lab facility for IC design and testing, the entity 710 represents a fab facility, and the entity 712 represents a process (e.g., an automated fabrication process) either inside the fab 710, or at another facility. Each entity may interact with other entities and may provide services to and/or receive services from the other entities.

The service system 702 provides an interface between the customer and the IC manufacturing operations. For example, the service system 702 may include customer service personnel 716, a logistics system 718 for order handling and tracking, and a customer interface 720 for enabling a customer to directly access various aspects of an order.

The logistics system 718 may include a work-in-process (WIP) inventory system 324, a product data management system 726, a lot control system 728, and a manufacturing execution system (MES) 730. The WIP inventory system 724 may track working lots using a database (not shown). The product data management system 726 may manage product data and maintain a product database (not shown). The product database could include product categories (e.g., part, part numbers, and associated information), as well as a set of process stages that are associated with each category of products. The lot control system 728 may convert a process stage to its corresponding process steps.

The MES 730 may be an integrated computer system representing the methods and tools used to accomplish production. In the present example, the primary functions of the MES 730 may include collecting data in real time, organizing and storing the data in a centralized database, work order management, workstation management, process management, inventory tracking, and document control. The MES 730 may be connected to other systems both within the service system 702 and outside of the service system 702.

The customer interface 720 may include an online system 732 and an order management system 734. The online system 732 may function as an interface to communicate with the customer 704, other systems within the service system 702, supporting databases (not shown), and other entities 706-712. The order management system 734 may manage client orders and may be associated with a supporting database (not shown) to maintain client information and associated order information.

Portions of the service system 702, such as the customer interface 720, may be associated with a computer system 722 or may have their own computer systems. In some embodiments, the computer system 722 may include multiple computers, some of which may operate as servers to provide services to the customer 704 or other entities. The service system 702 may also provide such services as identification validation and access control, both to prevent unauthorized users from accessing data and to ensure that an authorized customer can access only their own data.

The customer 704 may obtain information about the manufacturing of its ICs via the virtual fab 700 using a computer system 736. In the present example, the customer 704 may access the various entities 702, 706-712 of the virtual fab 700 through the customer interface 720 provided by the service system 702. However, in some situations, it may be desirable to enable the customer 704 to access other entities without going through the customer interface 720. For example, the customer 704 may directly access the fab facility 710 to obtain fabrication related data.

The engineer 706 may collaborate in the IC manufacturing process with other entities of the virtual fab 700 using a computer system 738. The virtual fab 700 enables the engineer 706 to collaborate with other engineers and the design/lab facility 708 in IC design and testing, to monitor fabrication processes at the fab facility 710, and to obtain information regarding test runs, yields, etc. In some embodiments, the engineer 706 may communicate directly with the customer 704 via the virtual fab 700 to address design issues and other concerns.

The design/lab facility 708 provides IC design and testing services that may be accessed by other entities via the virtual fab 700. The design/lab facility 308 may include a computer system 740 and various IC design and testing tools 742. The IC design and testing tools 742 may include both software and hardware.

The fab facility 710 enables the fabrication of ICs. Control of various aspects of the fabrication process, as well as data collected during the fabrication process, may be accessed via the virtual fab 700. The fab facility 710 may include a computer system 744 and various fabrication hardware and software tools and equipment 746. For example, the fab facility 710 may include an ion implantation tool, a chemical vapor deposition tool, a thermal oxidation tool, a sputtering tool, and various optical imaging systems, as well as the software needed to control these components.

The process 712 may represent any process or operation that occurs within the virtual fab 700. For example, the process 712 may be an order process that receives an IC order from the customer 704 via the service system 702, a fabrication process that runs within the fab facility 710, a design process executed by the engineer 706 using the design/lab facility 708, or a communications protocol that facilitates communications between the various entities 702-712.

It is understood that the entities 702-712 of the virtual fab 700, as well as their described interconnections, are for purposes of illustration only. For example, it is envisioned that more or fewer entities, both internal and external, may exist within the virtual fab 700, and that some entities may be incorporated into other entities or distributed. For example, the service system 702 may be distributed among the various entities 706-710.

The adaptor 304 may be used to connect entities in the virtual fab 700 to enable communication between incompatible components. In one example, the adaptor 304 may be included in the service system 702 to facilitate the communication between the MES 730 and the Fab Facility 710. In another example, the Fab Facility 710 may comprise the adaptor 304. It is also contemplated that the adapter 304 may be implemented in a variety of other entities within the virtual fab 700.

Although only a few exemplary embodiments of this invention have been described in detail above, those skilled in the art will readily appreciate that many modifications are possible in the exemplary embodiments without materially departing from the novel teachings and advantages of this invention. Also, features illustrated and discussed above with respect to some embodiments can be combined with features illustrated and discussed above with respect to other embodiments. Accordingly, all such modifications are intended to be included within the scope of this invention.

What is claimed is:

1. A method for processing data in a semiconductor manufacturing environment, the method comprising:
   processing one or more bytes of a data set as a block wherein the data set comprises Asian language characters;
   comparing the first byte of the one or more bytes with a value;
   transforming the data set by deleting an identifier following each byte of the one or more bytes, if the first byte is larger than the value; and
   transmitting the transformed data set to a first device.

2. The method of claim 1 further comprising receiving the data set from a second device.

3. The method of claim 1 wherein the identifier is 0.

4. The method of claim 1 wherein the value is 127.

5. The method of claim 1 wherein the Asian language characters comprise Chinese characters.

6. The method of claim 1 wherein the Asian language characters comprise Japanese characters.

7. The method of claim 1 wherein the Asian language characters comprise Korean characters.

8. A method for transmitting semiconductor manufacturing data in a virtual integrated circuits fabrication system, the method comprising:
   processing each two bytes of a first data set as a block wherein the first data set comprises Asian language characters;
   comparing the first byte of the each two bytes with 127;
   transforming the first data set by adding a zero after each byte of the each two bytes, if the first byte is larger than 127;
   comparing each byte of a second data set with 127 wherein the second data set comprises Asian language characters; and
   transforming the second data set by deleting a zero following the each byte of the second data set, if the each byte of the second data set is larger than 127.

9. The method of claim 8 wherein the Asian language characters comprise Chinese characters.

10. The method of claim 8 wherein the first data set comprises semiconductor manufacturing data transmitted in a virtual integrated circuits fabrication system environment.

* * * * *